: 3,474,060
Patented Oct. 21, 1969

3,474,060
AQUEOUS STOVE LACQUERS COMPRISING A BASIC PIGMENT AND A SALT OF AN ALKYD RESIN WITH A TERTIARY ALKYLAMINE
Rolf Dhein and Karl Raichle, Krefeld-Bockum, Germany, assignors to Farbenfabriken Bayer Aktiengesellschaft, Leverkusen, Germany, a corporation of Germany
No Drawing. Continuation of application Ser. No. 301,911, Aug. 13, 1963. This application Apr. 2, 1968, Ser. No. 718,636
Claims priority, application Germany, Aug. 18, 1962, F 37,626
Int. Cl. C08g *17/16;* C09d *5/00*
U.S. Cl. 260—21
8 Claims

ABSTRACT OF THE DISCLOSURE

Aqueous stove lacquers which comprise salts of fatty acid radical-containing alkyd resins with organic amines which are substantially or completely miscible with water, and which have a very good storage stability and can be worked up to lacquer coatings with outstanding water stability, considerably improved weather resistance and improved gloss, are obtained by using, as organic amines, volatile tertiary alkylamines with a total of up to 9 carbon atoms, and adding basic pigments to such lacquers.

This application is a continuation of Ser. No. 301,911, filed Aug. 13, 1963, now abandoned.

The present invention is concerned with aqueous stove lacquers.

Aqueous stove lacquers have been known for a long time and are receiving increasing attention because the use of water instead of organic solvents offers considerable advantages. They consist either of aqueous emulsions of water-insoluble lacquer-binding agents, mostly produced with the use of surface-active materials, or of aqueous solutions of especially those lacquer-binding agents which contain acid end groups and are made water-soluble by the addition of basic materials, said solutions possibly also containing organic solvents which are still substantially or completely miscible with water. In general, the aqueous solutions are preferred to the emulsions because they are insensitive even to considerable variations of temperature and do not contain surface-active materials which adversely affect the water stability of the lacquer coating produced therefrom.

Known aqueous solutions of lacquer-binding agents contain, for example, salts of fatty acid radical-containing alkyd resins with ammonia or primary, secondary or tertiary organic amines. An essential disadvantage of the known aqueous lacquer-binding agent solutions of this kind produced with the use of ammonia, consists in that they cannot be worked up with basic pigments. In particular, the addition of the basic pigment zinc white, which consists mainly of zinc oxide and which is valued because of its corrosion-inhibiting effect and, for example, is used in air-drying oil paint coatings with good results for the surface protection of metals, is here not possible since the addition of zinc white to solutions of this kind causes a considerable increase in viscosity and a partial or complete insolubilization of the resins dissolved in water. Furthermore, in the case of those aqueous lacquer-binding agent solutions which have been produced with the use of organic amines, the addition of basic pigments, especially of zinc white, causes, according to previous opinion, an undesirable reduction of the storage stability and an impairment of the water stability and of the weather resistance of lacquer coatings produced therefrom. Consequently, hitherto no lacquer-binding agent solutions of the type mentioned have been provided with an addition of basic pigments. Furthermore, this also applies to those aqueous lacquer-binding agent solutions which, as is usual in many cases, additionally contain water-soluble urea- or melamine-formaldehyde resins. A good weather resistance and a good water stability, together with the greatest possible corrosion protection of the lacquer coatings is, however, an important prerequisite for the suitability of an aqueous stove lacquer for the production of lacquer coatings, especially on metal surfaces.

We have now, surprisingly, found that aqueous lacquer-binding agent solutions which comprise salts of fatty acid radical-containing alkyd resins with organic amines, possibly containing organic solvents which are substantially or completely miscible with water, and which have a very good storage stability and can be worked up to lacquer coatings with outstanding water stability, considerably improved weather resistance and improved gloss, are obtained by using, as organic amines, volatile tertiary alkylamines with a total of up to 9 carbon atoms or mixtures of such amines, and adding basic pigments, especially zinc white, to the lacquer-binding agent solutions.

Surprisingly, an improvement of the properties of the lacquer coatings is only possible by the addition of basic pigments with the use of the special tertiary alkylamines according to the present invention, whereas aqueous lacquer-binding agent solutions of the above-mentioned kind which admittedly also contain basic pigments but have been produced with the use of other tertiary amines or of primary or secondary amines, give lacquer coatings with appreciably lower water stability and weather resistance.

Examples of volatile tertiary aliphatic amines of the kind mentioned include, for example, trimethylamines, triethylamine, tri-n-propylamine, tri-isopropylamine and diethyl butylamine. The aqueous lacquer-binding agent solutions according to the present invention preferably contain said tertiary amines in such amounts that the pH value of the solutions amounts to at least 6.5. It is, however, expedient to use at least the amount of amine equivalent to the acid number. Preferably, the quantity of amine added is such that the pH value of the lacquer-binding agent solution amounts to 7.5. Still larger amounts of amines and correspondingly higher pH values are also possible.

As basic pigments, there can be used, for example, not only zinc white, but also chemically pure zinc oxide, as well as lead white (basic lead carbonate:

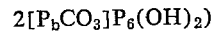

lead cyanamide and red lead oxide or mixtures of basic pigments.

Possibly, however, by the addition of larger amounts, preferably about 5–15%, a further improvement of the water stability and weather resistance of the lacquer coatings can be achieved. The addition of still larger amounts of basic pigments is also possible.

Besides basic pigments, other customary pigments can, if desired, also be added in the usual amounts to the aqueous stove lacquers, such as, for example, titanium dioxides, iron oxides and chromium oxide, as well as organic pigments and also fillers, such as barium sulfate.

According to the present invention, it is thus possible, for the first time, to produce aqueous stove lacquers which are pigmented not only with the pigments previously customary for this purpose, but also with basic pigments, especially zinc white. In addition, there results, as an essential advantage of the addition of basic pigments, an increased water stability and weather resistance of the lacquer coatings.

Aqueous stove lacquers according to the present invention which contain a pigments, besides zinc oxide, titanium dioxide, give, especially in combination with water-soluble aminoplasts, lacquer coatings which, in comparison with films which are only pigmented with titanium dioxide, show, besides an especially outstanding water stability and weather resistance, a clearly improved gloss, especially when the acid number of the fundamental alkyd resins amounts to less than 40. Acid numbers of the fundamental alkyd resins of more than 40 can impair this improvement of gloss, while the hydroxyl numbers are without influence in this respect. Coatings from the same lacquers which do not contain zinc oxide but only neutral pigments, such as titanium dioxide, are often dull, show after only a short watering, a clear deterioration of the film stability and a very early start of bubble formation, as well as a poor weather resistance.

The fatty acid radical containing alkyl resins can be produced in known manner from non-drying, semi-drying or drying-oils, such as, for instance, coconut oil, cotton seed oil, peanut oil, castor oil, ricinic oil, soya oil, linseed oil and tung oil, or mixtures of such oils, from polybasic acids or their anhydrides, such as, for example, phthalic anhydride, isophthalic acid, tetrachlorophthalic acid, benzene tricarboxylic acids, succinic acid, adipic acid, and maleic and fumaric acid, and polyols, such as, for example, ethylene glycol, diethylene glycol, butanediols, pentene-diols, hexane-diols, glycerol, trimethylolethane, -propane and -butane, pentaerythritol and dipentaerythritol.

It is also possible to use instead of oils or in combination with oils, fatty acids from natural oils or synthetic fatty acids or products obtained from natural fatty acids by hydrogenation, dehydration or dimerization. Such fatty acids are, for example, soya bean fatty acid, linseed oil fatty acid, coconut oil fatty acid, ricinolic acid, hydrogenated ricinolic acid, ricinic acid and the fatty acids obtainable from paraffinic hydrocarbons.

In addition, the mentioned alkyd resins can also be modified by the incorporation of naturally-occurring resins, such as colophony, or resin acids, such as abietic acid, or derivatives obtained therefrom, such as abietyl alcohol. The production of alkyd resins is described, for instance, in "Chemie und Technologie der künstlichen Harze" by Johannes Scheiber, Wissenschaftliche Verlagsgesellschaft, Stuttgart, 1943, page 613 and followings.

Besides the mentioned alkyd resins, the aqueous stove lacquers according to the present invention may also contain other water-soluble lacquer-binding agents, especially water-soluble aminoplasts, such as urea- and/or melamine formaldehyde resins, whereby especially resistant lacquer coatings are obtained. The production of urea- and melamine formaldehyde resins is described, for instance, in "Ullmanns Enzyklopädie der technischen Chemie," 3.Auflage, 1963, Verlag Urban und Schwarzenberg, München-Berlin, vol. 3, page 475 and followings.

After the addition of the mentioned amines, the fatty acid radical-containing alkyd resins can only be satisfactorily dissolved in water, possibly with the addition of organic solvents which are substantially or completely miscible with water, if the alkyd resins possess acid numbers above about 25. In general, alkyd resins with acid numbers between about 25 and about 40 and hydroxyl numbers between about 30 and about 150 are especially preferred.

Free hydroxyl groups augment, in a favourable manner, the water solubility of the alkyd resins, higher hydroxyl numbers, for example, those between about 150 and 250, and/or higher acid numbers, for example, those between about 40 and 70, merit preference, in particular, when stove lacquers which are especially readily dilutable with water and of especially low viscosity, which are suitable, for example, as dipping lacquers, are to be produced. Alkyd resins with acid numbers above 80 and/or hydroxyl numbers above about 250 can certainly also be used but are less suitable for the production of especially water-stable and weather-resistant coatings because of the numerous hydrophilic groups, although it is possible to compensate this disadvantage substantially by the addition of large amounts of basic pigments.

If the mentioned alkyd resins are to be used together with water-soluble aminoplasts, then it is expedient to ensure a sufficiently high content of free hydroxyl groups in the resins, in order that a substantial cross-linking can take place during stoving by the reaction of the aminoplasts with the free hydroxyl groups. Alkyd resins with hydroxyl numbers above about 30 have proved to be especially suitable for this purpose.

The production of the aqueous stove lacquers according to the present invention can be effected by the addition of the mentioned tertiary aliphatic amines to the liquified alkyd resin, with stirring and dilution of the reaction mixture with water, or by kneading the alkyd resin with the amine and a small amount of water in a kneader, and dilution of the resultant concentrated solution with water. It is, however, also possible first to dissolve the alkyd resin in one or more organic solvents which are partially or completely miscible with water, especially ether alcohols, such as, for example, ethylene glycol monomethyl ether, ethylene glycol monoethyl ether, ethylene glycol monobutyl ether and the acetates of these ethers, possibly also in admixture with other organic solvents, such as, for example, alcohols including ethanol, propanol, the butanols, ethylene glycol and diethylene glycol, esters including ethyl acetate and butyl formate, ketones including acetone and diethyl ketone, or ethers including diethyl and dipropyl ether, diethylene glycol monoethyl ether and dioxane, to mix the solution obtained with the tertiary aliphatic amine and to dilute the resultant salt solution with water. The viscosity of the solution is dependent, apart from the nature of the alkyd resin used and its amount and the number of hydrophilic groups contained therein, also upon the nature and the amount of the possibly conjointly used organic solvent. Solutions with a content of ethylene glycol monobutyl ether possess, for example, comparatively low viscosities.

The addition of the basic pigments and of the possibly conjointly used other pigments and fillers to the aqueous binding agent solutions can take place according to the usual processess. In order to ensure a good wetting, roller mills and ball mills are suitable. It is possible, for example, to proceed in such a manner that a paste is first produced from the mentioned materials and a concentrated binding agent solution by grinding, and the desired stove lacquer produced from the so-obtained paste by the addition of water and further binding agent solution, possibly with the addition of water-soluble aminoplasts. If desired, aqueous binding agent solutions which already contain basic pigments can also subsequently be mixed with further pigments and/or fillers.

The so-obtained aqueous stove lacquers can be applied immediately, but preferably after an ageing period of about 48 to 72 hours or longer, to the objects to be lacquered according to the usual processes, for example, by spraying, dipping, pouring, brushing or flow coating. The hardening of the coatings takes place at temperatures above about 100° C., for instance, at about 120 to about 180° C., the necessary period of stoving depending upon the chosen stoving temperature.

Lacquer coatings are obtained which, even after watering for several weeks, do not form bubbles or loose mechanical stability by the influence of the water, in contradistinction to zinc oxide-free coatings or to coatings of zinc oxide-containing stove lacquers which have been produced, instead of with the mentioned volatile tertiary amines, with other, for example, primary or barely volatile tertiary amines, which, after only a short influence by water, have become clearly less scratch-resistant or show, after only 2-3 days, a marked bubble formation, or even both effects.

The following examples are given for the purpose of illustrating the present invention, the parts being parts by weight, unless otherwise stated:

Example 1

From 932 parts of castor oil, 442 parts of trimethylolpropane, 194 parts of pentaerythritol, 663 parts of phthalic anhydride and 204 parts of adipic acid, an alkyd resin is produced by reacting the castor oil with 300 parts of the trimethylol-propane and 441 parts of the phthalic anhydride at 260° C. in an atmosphere of nitrogen and with stirring until the initially decreasing viscosity (measured in a 70% solution in toluene according to German Industrial Standard No. 53,211) begins to increase. This reaction product is transesterified for about 1 hour at 250° C. with the remainder of the trimethylolpropane and the pentaerythritol. Thereafter, the remaining amount of the phthalic anhydride and the whole amount of the adipic acid is added and the reaction mixture subsequently heated at temperatures between 150 and 180° C. until an alkyd resin is finally obtained with an acid number of 35. The so-obtained resin, which possesses a hydroxyl number of 134–135 and a viscosity of 150–190 seconds (measured in a 50% solution in xylene according to German Industrial Standard No. 53,211), is cooled at 120° C. and subsequently dissolved in ethylene glycol monobutyl ether to give a 63.5% solution.

1(a) A part of this alkyd resin solution is, for comparison, mixed at a temperature below 40° C. with a concentrated aqueous ammonia solution in such an amount that a test dilution in water containing 30% of alkyd resin shows a pH value of 7.5 (measured with Merck's special indicator paper, pH range 6.4–8.0). The alkyd resin solution in ethylene glycol monobutyl ether, mixed with ammonia, is then diluted with distilled water so that a solution results which contains 55% of alkyd resin.

1(b) An alkyd resin solution is produced as described under 1(a) which, however, instead of ammonia, contains triethylamine in such an amount that the same pH value is obtained.

From the solutions 1(a) and 1(b) there are prepared lacquers of the following constitution:

|  | Lacquer 1(a) | Lacquer 1(b) |
|---|---|---|
| Solution | 54.50 parts 1(a) | 54.50 parts 1(b). |
| Titanium dioxide (rutile, finely-dispersed) | 12.75 parts 1(a) | 12.75 parts 1(b). |
| Zinc white | 2.25 parts 1(a) | 2.25 parts 1(b). |
| Water (distilled) | 30.50 parts 1(a) | 30.50 parts 1(b). |

After only a short storage of the two lacquers, it can be seen that lacquer 1(a) is not compatible with zinc white. The presence of zinc oxide leads, in an average of only four weeks, to an insolubilization of the alkyd resin in the aqueous medium, whereas lacquer 1(b) remains unchanged.

If lacquers are produced corresponding to the compositions of lacquers 1(a) and 1(b) but containing only titanium dioxide instead of a mixture of titanium dioxide and zinc white, then it is found that upon storage of these zinc oxide-free lacquers, no alkyd resin separates out even from the lacquer produced from solution 1(a).

Example 2

The following lacquers are produced from the solution 1(b) described in Example 1:

|  | Lacquer 2(a), parts | Lacquer 2(b), parts |
|---|---|---|
| Solution 1(b) | 45.40 | 45.40 |
| Titanium dioxide (rutile, finely dispersed) | 10.62 | 12.50 |
| Zinc white | 1.88 | |
| Aqueous melamine resin solution (60%, prod. acc. to Fr. Pat. 943,411; Ex. 2) | 8.35 | 8.35 |
| Water | 33.75 | 33.75 |

After an ageing period of 72 hours, the lacquers are applied to iron sheets with a spray pistol and the so-lacquered sheets, after an aeration period of about 10 minutes, stoved for 30 minutes at 150° C. The improvement brought about by the zinc white of the lacquer films, the thickness of which is 30–40 microns, can be seen from Table I. Testing of the water stability was carried out by dipping the lacquered sheets in tap water and alterations of the coatings under the influence of the water, for example, as to their mechanical stability, ascertained by scratching with a finger nail. The gloss evaluation was carried out according to ASTM D523–53T, at an angle of reflection of 20° C., in a Gardner glossmeter.

TABLE I

| Coating produced from lacquer | Zinc oxide content in the lacquer, percent | Result of the film testing | | |
|---|---|---|---|---|
| | | Gloss | Water stability after— | |
| | | | 24 hrs. | 192 hrs. |
| 2(a) | 1.88 | 39 | 0 | 0 |
| 2(b) | 0.00 | 3 | 1-2 | 2 |

Explanation of Table I:

Gloss evaluation: The gloss of the coatings is the higher, the higher the measured values found.

Evaluation of the water stability:

0: coating unchanged after watering.
1: first noticeable attack; can already be damaged with a finger nail.
2: marked attack; film can very readily be damaged with a finger nail and readily be scratched off from base.

Example 3

The following lacquers are produced from solution 1(b) described in Example 1:

|  | Lacquer 3(a), parts | Lacquer 3(b), parts |
|---|---|---|
| Solution 1(b) | 54.50 | 54.50 |
| Titanium dioxide (rutile, finely dispersed) | 12.75 | 15.00 |
| Zinc white | 2.25 | |
| Water | 30.50 | 30.50 |

Iron sheets are lacquered with both lacquers as described in Example 2 and stoved for 30 minutes at 170° C. The improvement with zinc oxide, which here consist above all in the prevention of bubble formation which damages the lacquer film, are seen from Table II.

TABLE II

| Coating produced from lacquer | Zinc oxide content in the lacquer, percent | Result of the film testing | | |
|---|---|---|---|---|
| | | Gloss | Water stability after— | |
| | | | 96 hrs. | 400 hrs. |
| 3(a) | 2.25 | 63 | Bubble-free | Bubble-free. |
| 3(b) | 0.00 | 33 | Strong bubble formation. | |

Example 4

The 63.5% alkyd resin solution in ethylene glycol monobutyl ether described in Example 1 is divided into several test samples and mixed with the amines set out in the following Table III in such amounts that, as already described, diluted test samples show a pH value of 7.5. After the addition of the amines, the alkyd resin salt solutions are diluted with distilled water to an alkyd resin content of 55%.

Lacquers of the following constitution were prepared from these 55% alkyd resin solutions containing the different amines:

Parts
55% alkyd resin solution _____ 45.40
Titanium dioxide (rutile, finely-dispersed) _____ 10.62
Zinc white _____ 1.88
Aqueous melamine resin solution (see Example 2) _____ 8.35
Water _____ 33.75

Coatings are produced on iron sheets from the lacquers, as described in Example 2, and tested as there stated. Table III clearly shows the dependence of the improvement of the water stability brought about by the zinc oxide upon the amines contained in the lacquer.

TABLE III

| Amine contained in the lacquer | Water stability after— | | |
|---|---|---|---|
|  | 24 hrs. | 288 hrs. | 432 hrs. |
| Ethylamine | 1–2 | | |
| Ethanolamine | 2 | | |
| Diethylamine | 0–1 | 1–2 | |
| Morpholine | 2 | | |
| Triethanolamine | 2 | | |
| Triethylamine | 0 | 0 | 0–1 |
| Trimethylamine | 0 | 0 | 0 |

Evaluation of the water stability is equal to that indicated in Example 2.

Example 5

From 822 parts of linseed oil, 47.6 parts of linseed oil fatty acid, 963 parts of trimethylol-propane and 5.2 parts of glycerol, there is produced in known manner at 250° C., with stirring, in an atmosphere of nitrogen, a transesterification product which is subsequently esterified, after the addition of 1243 parts of phthalic anhydride, at 170° C. until an alkyd resin is formed with an acid number of 37. The so-obtained resin, which possesses a hydroxyl number of 117–120 and a viscosity of 70–90 seconds, measured in a 50% solution in xylene according to German Industrial Standard No. 53,211, is dissolved at 120° C. in ethylene glycol monobutyl ether to give a 63.5% solution and mixed at about 40° C. with triethylamine in such amounts that a test dilution in water containing 30% of alkyd resin shows a pH value of 7.5 (measured with Merck's special indicator paper, pH range 6.4–8.0). The so-obtained solution is then diluted, at a temperature below 40° C., with distilled water to an alkyd resin content of 55%. This solution can be clearly diluted with water down to an alkyd resin content of 20%. Upon further dilution the solution becomes somewhat opaque.

The two following lacquers are prepared from the 55% solution:

|  | Lacquer 5(a), parts | Lacquer 5(b), parts |
|---|---|---|
| 55% alkyd resin solution | 45.50 | 45.50 |
| Aqueous 60% melamine resin solution (see Example 2) | 8.35 | 8.35 |
| Zinc white | 1.87 | |
| Water | 44.28 | 46.15 |

The test results summarized in Table IV were tested on coatings which had been produced from these lacquers as described in Example 2.

TABLE IV

| Coating from lacquer | Zinc oxide content in the lacquer, percent | Result of the film testing Water stability after— | |
|---|---|---|---|
|  |  | 144 hrs. | 336 hrs. |
| 5(a) | 1.87 | Bubble-free | Bubble-free. |
| 5(b) | 0.00 | Marked bubble formation | |

Example 6

From 822 parts of soya bean oil, 47.6 parts of soya bean fatty acid, 228 parts of pentaerythritol and 5.2 parts of glycerol, there is produced in known manner at 250° C. a transesterification product which is subsequently esterified at 170° C. with 156 parts of pentaerythritol and 580 parts of phthalic anhydride until an alkyd resin is obtained with an acid number of 35. The so-obtained resin, which possesses a hydroxyl number of 141–143 and a viscosity of 40–60 seconds, measured in a 50% xylene solution according to German Industrial Standard No. 53,211, is subsequently dissolved, mixed with triethylamine and then diluted with water to an alkyd resin content of 55%, as described in Example 5. This solution can be clearly diluted with water down an alkyd resin content of 20%; more dilute solutions are somewhat opaque.

The following lacquers are prepared from 55% solution:

|  | Lacquer 6(a), parts | Lacquer 6(b), parts |
|---|---|---|
| 55% solution | 45.40 | 45.40 |
| Aqueous 60% melamine resin solution (see Example 2) | 8.35 | 8.35 |
| Chromium oxide green | 6.25 | 12.50 |
| Zinc oxide | 6.25 | |
| Water | 33.75 | 33.75 |

Table V shows that the water stability of coatings produced as described in Example 2 is improved by zinc oxide.

TABLE V

| Coatings from lacquer | Zinc oxide content in the lacquer, percent | Water stability | | |
|---|---|---|---|---|
|  |  | 120 hrs. | 288 hrs. | 456 hrs. |
| 6(a) | 6.25 | Bubble-free | Bubble-free | Bubble-free. |
| 6(b) | 0.00 | do | Strong bubble formation | |

Example 7

The following lacquers are prepared from 55% alkyd resin solution described in Example 6:

|  | Lacquer 7(a), parts | Lacquer 7(b), parts |
|---|---|---|
| 55% solution | 45.50 | 45.50 |
| Aqueous 60% melamine resin solution (see Example 2) | 8.35 | 8.35 |
| Titanium dioxide | 6.25 | 12.50 |
| White lead | 6.25 | |
| Water | 33.75 | 33.75 |

Table VI shows the water stability improved by white lead of the coatings produced as in Example 2.

TABLE VI

| Coatings from lacquer | White lead content in the lacquer, percent | Water stability after | | |
|---|---|---|---|---|
|  |  | 144 hrs. | 288 hrs. | 552 hrs. |
| 7(a) | 6.25 | Bubble-free | Bubble-free | Bubble-free. |
| 7(b) | 0.00 | do | Strong bubble formation | |

We claim:

1. An aqueous stove lacquer comprising an aqueous aqueous solution of (A) a salt of a fatty acid radical-containing alkyd resin and a volatile tertiary alkylamine having a total of up to 9 carbon atoms and (B) a basic pigment, said alkyd resin being the reaction product of (1) fatty oils, fatty acids or mixtures thereof, (2) polybasic acids or anhydrides thereof and (3) polyhydroxy alcohols selected solely from the group consisting of ethylene glycol, diethylene glycol, butane diol, pentene diol, hexane diol, glycerol, trimethylol-ethane, trimethylol-propane, trimethylol-butane, pentaerythritol and dipentaerythritol and said alkyd resin having an acid number between about 25 and about 80 and a hydroxyl number between about 30 and about 250.

2. The aqueous stove lacquer of claim 1 wherein said alkyd resin has an acid number between about 25 and about 40 and a hydroxyl number between about 30 and about 150.

3. The aqueous stove lacquer of claim 1 wherein said basic pigment, is zinc white.

4. The aqueous stove lacquer of claim 3 containing from about 1 to about 15% by weight of zinc white.

5. The aqueous stove lacquer of claim 1 containing an aminoplast.

6. The aqueous stove lacquer of claim 1 wherein the amount of amine employed obtains a pH of at least 6.5.

7. The aqueous stove lacquer of claim 1 wherein said fatty oils, fatty acids and mixtures thereof are selected from the group consisting of coconut oil, cotton seed oil, peanut oil, castor oil, ricinic oil, soya oil, linseed oil, tung oil, soya bean fatty acid, linseed oil fatty acid, coconut oil fatty acid, ricinolic acid, hydrogenated ricinolic acid, ricinic acid, fatty acids obtained from paraffinic hydrocarbons and mixtures thereof and said polybasic acids or anhydrides thereof are selected from the group consisting of phthalic anhydride, isophthalic acid, tetrachlorophthalic acid, benzene tricarboxylic acid, succinic acid, adipic acid, maleic acid and fumaric acid.

8. The aqueous stove lacquer of claim 7 wherein the fatty acid radical-containing alkyd resin is modified by colophony, a resin acid or a derivative thereof.

References Cited

UNITED STATES PATENTS

| | | |
|---|---|---|
| 2,277,393 | 3/1942 | Depew. |
| 2,440,953 | 5/1948 | Iliff et al. |
| 2,526,427 | 10/1950 | Simon et al. |
| 2,881,145 | 4/1959 | Schmutzler. |
| 2,904,526 | 9/1959 | Uelzmann. |
| 2,985,539 | 5/1961 | König. |
| 3,098,834 | 7/1963 | Jerabek |
| 3,110,690 | 11/1963 | Friedsam. |
| 3,133,032 | 5/1964 | Jen et al. |
| 3,196,117 | 7/1965 | Boller. |
| 3,196,118 | 7/1965 | Peters |
| 3,223,659 | 12/1965 | Curtice et al. |

FOREIGN PATENTS

| | | |
|---|---|---|
| 464,638 | 4/1937 | Great Britain. |

OTHER REFERENCES

Paint Industry Technical Yearbook and Materials Manual, 1959, volume 4, Heckel Publishing Co., Philadelphia, Pa., 322 pages, pages 15, 109, and 110 relied upon.

DONALD E. CZAJA, Primary Examiner

R. W. GRIFFIN, Assistant Examiner

U.S. Cl. X.R.

260—22, 29.2, 29.4, 32.6, 32.8, 33.2 33.4, 39, 40

UNITED STATES PATENT OFFICE
CERTIFICATE OF CORRECTION

Patent No. 3,474,060          Dated October 21, 1969

Inventor(s) Rolf Dhein and Karl Raichle

It is certified that error appears in the above-identified patent and that said Letters Patent are hereby corrected as shown below:

Column 3, line 2, "a" should read -- as --;
           line 28, "pentene" should read -- pentane --.

Column 8, line 51, "aqueous solution" should read -- solution --.
           line 58, "pentene" should read -- pentane --.

SIGNED AND SEALED
MAY 5 1970

(SEAL)
Attest:

Edward M. Fletcher, Jr.
Attesting Officer

WILLIAM E. SCHUYLER, JR.
Commissioner of Patents